US012647461B2

(12) United States Patent
Banerjee et al.

(10) Patent No.: US 12,647,461 B2
(45) Date of Patent: Jun. 2, 2026

(54) TECHNIQUES FOR GENERATING POLICY RECOMMENDATIONS AND INSIGHTS USING GENERATIVE AI

(71) Applicant: OKTA, INC., San Francisco, CA (US)

(72) Inventors: Moushmi Banerjee, Cupertino, CA (US); Tanvir Islam, Lake Stevens, WA (US); Bhagyashree Prabhakar, Oakton, CA (US); Kumar Abhinav, Toronto (CA); Siyuan He, Victoria (CA); Ruixing Cai, San Francisco, CA (US)

( * ) Notice: Subject to any disclaimer, the term of this patent is extended or adjusted under 35 U.S.C. 154(b) by 289 days.

(21) Appl. No.: 18/479,760

(22) Filed: Oct. 2, 2023

(65) Prior Publication Data

US 2025/0112961 A1 Apr. 3, 2025

(51) Int. Cl.
*H04L 9/40* (2022.01)
*H04L 41/16* (2022.01)

(52) U.S. Cl.
CPC .............. *H04L 63/20* (2013.01); *H04L 41/16* (2013.01); *H04L 63/102* (2013.01)

(58) Field of Classification Search
CPC ........ H04L 63/20; H04L 41/16; H04L 63/102
See application file for complete search history.

(56) References Cited

U.S. PATENT DOCUMENTS

| | | | | |
|---|---|---|---|---|
| 10,263,995 | B1 * | 4/2019 | Kruse | H04L 63/102 |
| 10,616,196 | B1 * | 4/2020 | Khitrenovich | G06N 20/00 |
| 11,397,950 | B2 * | 7/2022 | Manjunath | G06Q 20/3674 |
| 12,014,096 | B1 * | 6/2024 | Murphy | G06F 3/1222 |
| 2014/0082726 | A1 * | 3/2014 | Dreller | H04L 51/48 726/23 |
| 2016/0063229 | A1 * | 3/2016 | Key | G06F 21/316 726/1 |
| 2016/0087957 | A1 * | 3/2016 | Shah | H04L 63/205 726/1 |
| 2016/0119379 | A1 * | 4/2016 | Nadkarni | H04L 63/0263 726/1 |
| 2016/0330746 | A1 * | 11/2016 | Mehrabanzad | H04L 67/535 |

(Continued)

*Primary Examiner* — Jason Chiang
(74) *Attorney, Agent, or Firm* — Holland & Hart LLP

(57) ABSTRACT

Methods, systems, devices, and computer-readable media for generating authentication policy recommendations and insights using generative AI are described. An authentication policy recommendation system associated with an identity management system may receive a request from a client organization for an authentication policy configuration recommendation for an application associated with the client organization. One or more recommended authentication policy rules may be generated for the application using a machine learning model (such as a large-learning model). The model may output the authentication policy rules in a machine-readable format. Based on an analysis of applying information about the client organization to the model-generated recommended authentication policy rule to generate a context-specific recommended authentication policy rule, an impact of implementing the context-specific recommended authentication policy rule may be determined and output. The impact of implementing the context-specific recommended authentication policy rule may be determined in advance of implementing the recommended authentication policy rule.

19 Claims, 7 Drawing Sheets

(56) References Cited

U.S. PATENT DOCUMENTS

| | | | |
|---|---|---|---|
| 2018/0084012 A1* | 3/2018 | Joseph | H04L 63/20 |
| 2019/0114404 A1* | 4/2019 | Nowak | H04W 12/06 |
| 2019/0260742 A1* | 8/2019 | Arora | H04W 12/65 |
| 2019/0372968 A1* | 12/2019 | Balogh | G06N 20/00 |
| 2020/0134623 A1* | 4/2020 | Sambhar | G06Q 20/34 |
| 2020/0402054 A1* | 12/2020 | Manjunath | G06Q 20/4016 |
| 2021/0243040 A1* | 8/2021 | Lu | G06F 16/245 |
| 2021/0289001 A1* | 9/2021 | Wilson | H04L 63/101 |
| 2021/0334148 A1* | 10/2021 | Prakash | G06N 5/02 |
| 2022/0067153 A1* | 3/2022 | Roy | G06T 19/006 |
| 2022/0109673 A1* | 4/2022 | Robinson-Morgan | H04L 63/0861 |
| 2023/0252308 A1* | 8/2023 | Roy | G06F 8/36 726/4 |
| 2023/0370449 A1* | 11/2023 | Hayes, Jr. | G06N 20/00 |
| 2024/0056820 A1* | 2/2024 | Huggins | H04W 12/63 |
| 2024/0146734 A1* | 5/2024 | Southgate | G06F 21/6227 |
| 2024/0281508 A1* | 8/2024 | Hirano | H04L 63/107 |
| 2025/0007955 A1* | 1/2025 | Freund | H04L 63/20 |

* cited by examiner

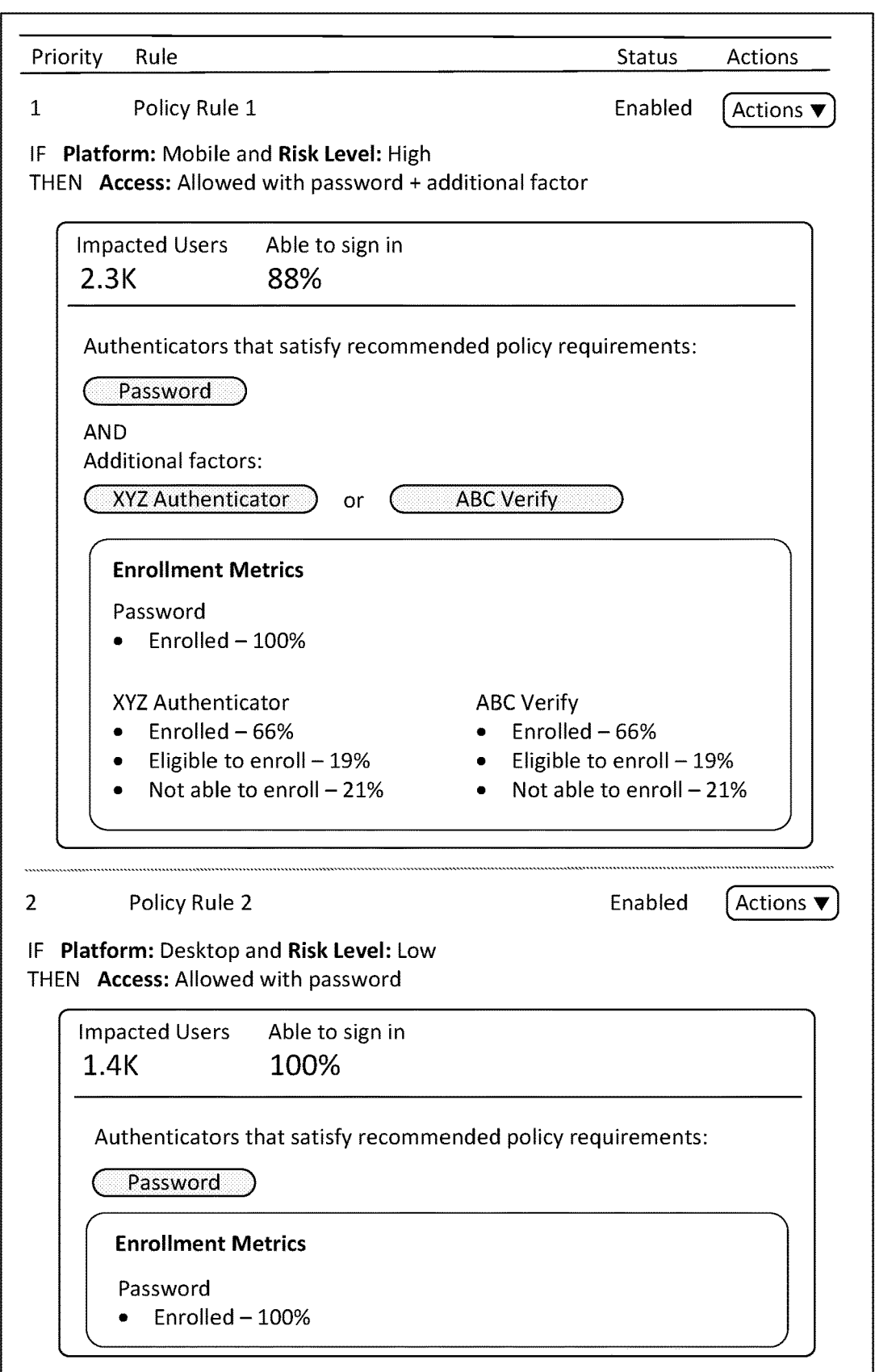

| Priority | Rule | Status | Actions |
|---|---|---|---|
| 1 | Policy Rule 1 | Enabled | Actions ▼ |

IF   Platform: Mobile and Risk Level: High
THEN   Access: Allowed with password + additional factor Impacted Users     Able to sign in
2.3K             88%

Authenticators that satisfy recommended policy requirements:

( Password )
AND
Additional factors:
( XYZ Authenticator )   or   ( ABC Verify )

Enrollment Metrics

Password
• Enrolled – 100%

XYZ Authenticator                ABC Verify
• Enrolled – 66%                 • Enrolled – 66%
• Eligible to enroll – 19%       • Eligible to enroll – 19%
• Not able to enroll – 21%       • Not able to enroll – 21%

| 2 | Policy Rule 2 | Enabled | Actions ▼ |
|---|---|---|---|

IF   Platform: Desktop and Risk Level: Low
THEN   Access: Allowed with password Impacted Users     Able to sign in
1.4K             100%

Authenticators that satisfy recommended policy requirements:

( Password )

Enrollment Metrics

Password
• Enrolled – 100%

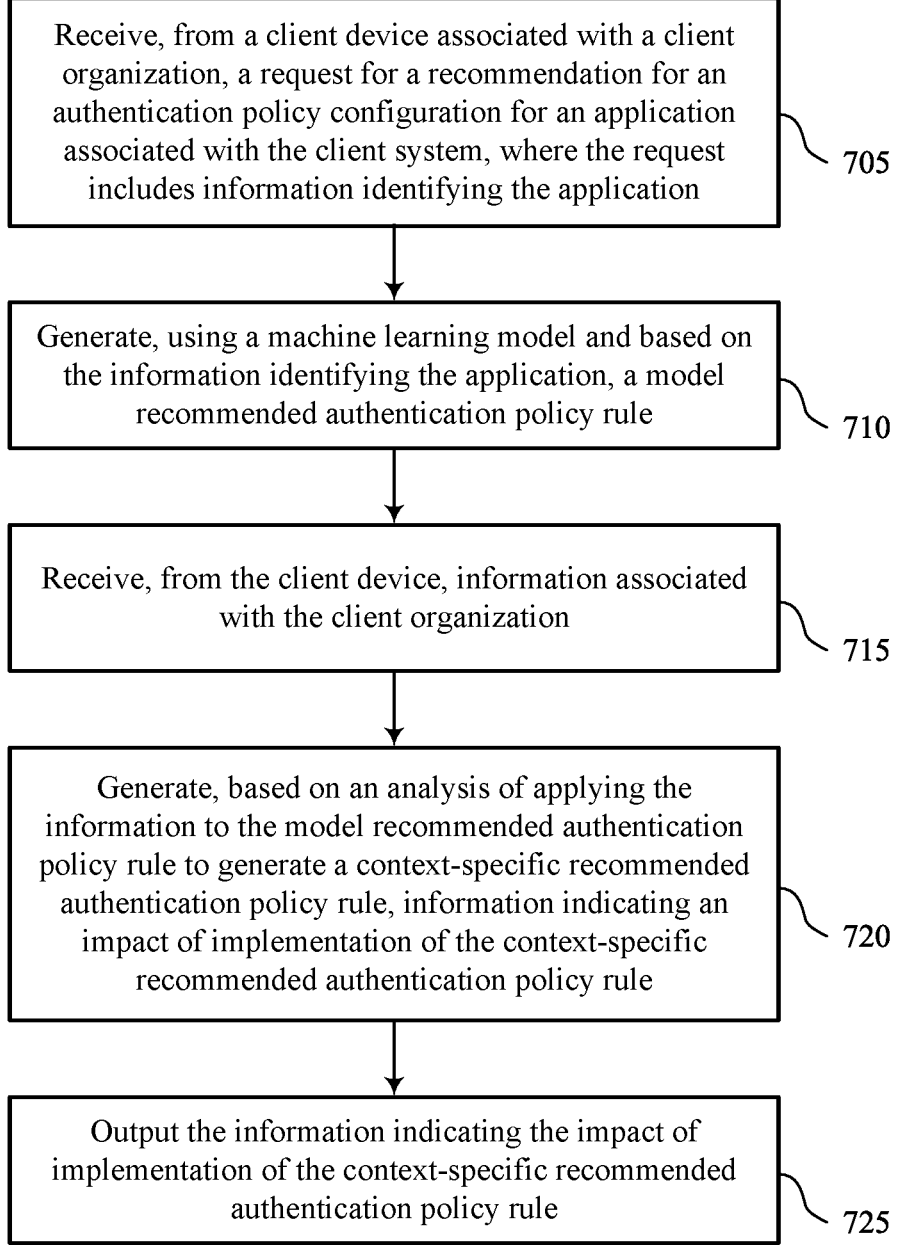

Receive, from a client device associated with a client organization, a request for a recommendation for an authentication policy configuration for an application associated with the client system, where the request includes information identifying the application — 705

Generate, using a machine learning model and based on the information identifying the application, a model recommended authentication policy rule — 710

Receive, from the client device, information associated with the client organization — 715

Generate, based on an analysis of applying the information to the model recommended authentication policy rule to generate a context-specific recommended authentication policy rule, information indicating an impact of implementation of the context-specific recommended authentication policy rule — 720

Output the information indicating the impact of implementation of the context-specific recommended authentication policy rule — 725

TECHNIQUES FOR GENERATING POLICY RECOMMENDATIONS AND INSIGHTS USING GENERATIVE AI

FIELD OF TECHNOLOGY

The present disclosure relates generally to identity and access management systems, and more specifically to techniques for generating authentication policy recommendations and insights using generative AI.

BACKGROUND

An identity management system may be employed by client organizations to manage and store various forms of user data, including usernames, passwords, email addresses, permissions, roles, group memberships, etc. The identity management system may provide authentication services for applications, devices, users, and the like associated with the client organizations. The identity management system may enable the client organizations to manage and control access to resources of the client organizations, for example, by serving as a central repository that integrates with various identity sources.

The identity management system may provide various authentication and access management tools for use by client organizations in accessing authentication and access management services provided by the identity management system. Such tools may be used by administrators of the client organizations to configure their computing environments, applications, and the like with the authentication and access management services. In some cases, administrators may be unaware of best practices for configuring their systems using such tools, thus resulting in sub-optimal configurations by the client organizations and leaving the client organizations vulnerable to potential security risks and poor user experiences.

SUMMARY

The described techniques relate to improved methods, systems, devices, and computer-readable media that support generating authentication policy recommendations and insights using generative AI. For example, the described techniques provide a framework for using generative AI to predict a suitable authentication policy configuration for a particular application associated with a client organization. The described techniques further provide for the generation, in advance of implementation of the recommended authentication policy, of insights into the impact that applying the recommendation will have on the client organization and their users.

A method by an authentication policy recommendation system associated with an identity management system is described. The method may include receiving, from a client device associated with a client organization, a request for a recommendation for an authentication policy configuration for an application associated with the client organization, where the request includes information identifying the application, generating, using a machine learning model and based on the information identifying the application, a model recommended authentication policy rule, receiving, from the client device, information associated with the client organization, generating, based on an analysis of applying the information to the model recommended authentication policy rule to generate a context-specific recommended authentication policy rule, information indicating an impact of implementation of the context-specific recommended authentication policy rule, and outputting the information indicating the impact of implementation of the context-specific recommended authentication policy rule.

An authentication policy recommendation device is described. The device may include one or more processors, and one or more memories storing instructions that, when executed by the one or more processors individually or collectively, cause the authentication policy recommendation device to receive, from a client device associated with a client organization, a request for a recommendation for an authentication policy configuration for an application associated with the client organization, where the request includes information identifying the application, generate, using a machine learning model and based on the information identifying the application, a model recommended authentication policy rule, receive, from the client device, information associated with the client organization, generate, based on an analysis of applying the information to the model recommended authentication policy rule to generate a context-specific recommended authentication policy rule, information indicating an impact of implementation of the context-specific recommended authentication policy rule, and output the information indicating the impact of implementation of the context-specific recommended authentication policy rule.

Another authentication policy recommendation device is described. The device may include means for receiving, from a client device associated with a client organization, a request for a recommendation for an authentication policy configuration for an application associated with the client organization, where the request includes information identifying the application, generating, using a machine learning model and based on the information identifying the application, a model recommended authentication policy rule, receiving, from the client device, information associated with the client organization, generating, based on an analysis of applying the information to the model recommended authentication policy rule to generate a context-specific recommended authentication policy rule, information indicating an impact of implementation of the context-specific recommended authentication policy rule, and outputting the information indicating the impact of implementation of the context-specific recommended authentication policy rule.

A non-transitory computer-readable medium storing code is described. The code may include instructions, that when executed by one or more processors individually or collectively, cause an authentication policy recommendation device to receive, from a client device associated with a client organization, a request for a recommendation for an authentication policy configuration for an application associated with the client organization, where the request includes information identifying the application, generate, using a machine learning model and based on the information identifying the application, a model recommended authentication policy rule, receive, from the client device, information associated with the client organization, generate, based on an analysis of applying the information to the model recommended authentication policy rule to generate a context-specific recommended authentication policy rule, information indicating an impact of implementation of the context-specific recommended authentication policy rule, and output the information indicating the impact of implementation of the context-specific recommended authentication policy rule.

BRIEF DESCRIPTION OF THE DRAWINGS

FIG. 3 shows an example of a user interface that supports generating policy recommendations and insights using generative AI in accordance with aspects of the present disclosure.

FIG. 7 shows a flowchart illustrating methods that support generating policy recommendations and insights using generative AI in accordance with aspects of the present disclosure.

DETAILED DESCRIPTION

Figure 1:
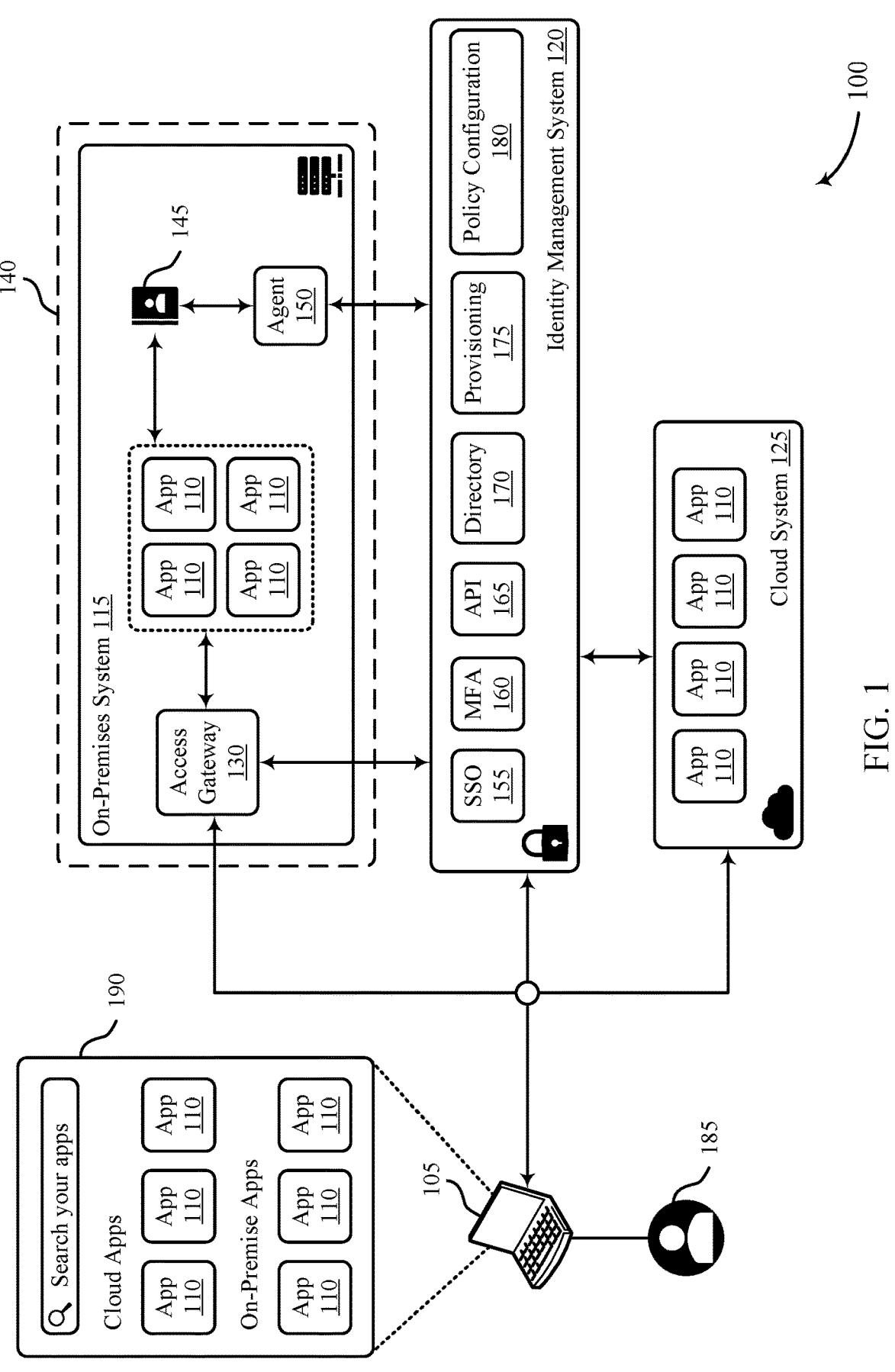
FIG. 1 illustrates an example of a computing system that supports generating policy recommendations and insights using generative AI in accordance with aspects of the present disclosure.

Cloud computing provides for the delivery of computing services or resources over the Internet. These services and resources may include software applications, data storage, databases, servers, virtual machines, operating systems, analytics, computing environments or platforms, authentication services, etc. Some organizations may use cloud computing to increase performance, manage computing and operating costs, provide for on-demand scalability of computing resources, improve reliability, and many other reasons. However, the use of cloud computing may present certain security vulnerabilities. As such, in order to ensure the security of an organization's cloud resources, and in some cases the organization's on-premises resources as well, the organization may use one or more tools to control access to the organization's resources (e.g., control what resources particular users are permitted to access, and what the users can do with the resources that they are permitted to access).

For example, when a user of an organization (e.g., an employee of the organization) wishes to access the organization's resources, the user may be requested to log into an account associated with the organization. The user may provide user credentials, such as a combination of a username and a password or other information. The system may use the user credentials as authentication information to verify an identity of the user. Once authenticated, the system may determine whether the user has been granted permission or privileges to access the requested resources.

In some cases, to alleviate a burden on an organization, the organization may employ a service provider, such as an identity management service provider, to provide identity and access management services on behalf of the organization. In such cases, the identity management service provider may provide the identity and access management service to the organization as well as to other organizations.

The multiple organizations may be clients of the identity management service provider and the identity management service provider may maintain an identity management system to manage the identities and access privileges of the users of the different client organizations on behalf of those client organizations.

In some cases the identity management system may provide one or more tools or services that enable the client organizations to configure certain identity and access management features for their systems. For instance, the identity management system may provide a tool or an interface that enables an administrator of a client organization to configure authentication policies to be used by applications of the client organization when users attempt to access those applications. Each authentication policy may dictate, for a particular application, the authentication requirements (such as the method of authentication that is required during sign on, e.g., password, multi-factor authentication, etc.) that are to be applied when various conditions are satisfied (such as when a user signs in from a mobile device, or from a particular network) during the sign on process. In some cases, client organizations may have difficulty configuring such policies due to the number of options and variations available for creating such configurations. As a result, client organizations may configure authentication policies that may not meet best practices or that may not be optimal for the particular organization's computing environment. This may render the client organizations vulnerable to security risks, prevent users from being able to access critical resources, and lead to poor user experiences.

In accordance with aspects described herein, the identity management system may leverage authentication policy data from its various client organizations, and maintained by the identity management system, to train a machine learning model, such as a large language model, to predict, for a given application or for certain conditions, authentication policies that meet best practices and security assurance standards defined by the identity management system. The identity management system may provide a tool or an interface through which client organizations may request an authentication policy recommendation for a particular application. Given the application name as an input, the machine learning model may output an authentication policy configuration predicted as being suitable and meeting best practices for the particular application. The machine learning model may output the authentication policy configuration in a machine-readable format, which may be used by the client organization to configure the application. The identity management system may further provide insights to the client organization as to the impact that applying the recommended policy will have on the client organization and its users. Such insights may be determined in advance of the client organization applying the recommended policy.

The described techniques allow for client organizations to more easily configure their applications using best practices and security assurance of the identity management system, thereby improving the security posture of the client organizations. Further, by generating insights into the impact that a recommended policy may have on a client organization, before the policy is applied, client organizations may avoid technical issues that may result from users being unable to access critical system resources, which also provides for an improved experience for users of the client organizations.

Aspects of the disclosure are initially described in the context of a computing system. Aspects of the disclosure are further illustrated by and described with reference to various diagrams and flowcharts that relate to techniques for generating policy recommendations and insights using generative AI.

FIG. 1 illustrates an example of a computing system 100 that supports techniques for generating policy recommendations and insights using generative AI in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, a provisioning service 175, or a authentication policy configuration service 180 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, the provisioning service 175 and/or the authentication policy configuration service 180 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120).

The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

The authentication policy configuration service 180 of the identity management system 120 may support configuring one or more applications 110 with an authentication policy. The authentication policy may specify what methods of authentication are required under various conditions when a user 185 attempts to access an application 110. For instance, the authentication policy may dictate which authentication factors (e.g., password only, MFA, etc.) are required by the user 185 when certain conditions are satisfied (e.g., the computing platform the user is signing in from, a domain associated with the user, etc.) during the sign on process. The authentication policy configuration service 180 may provide a tool or an interface that enables client organizations to configure authentication policies for their applications 110. In accordance with aspects described herein, in some cases, the authentication policy configuration service 180 may provide a service that recommends authentication policy configurations for the client organization for their applications. For instance, a policy recommendation system may use generative AI to generate such authentication policy recommendations. The policy recommendation system may further provide the client organizations with insights on how implementing or applying a recommended authentication policy may impact the client organization and its users.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

Figure 2:
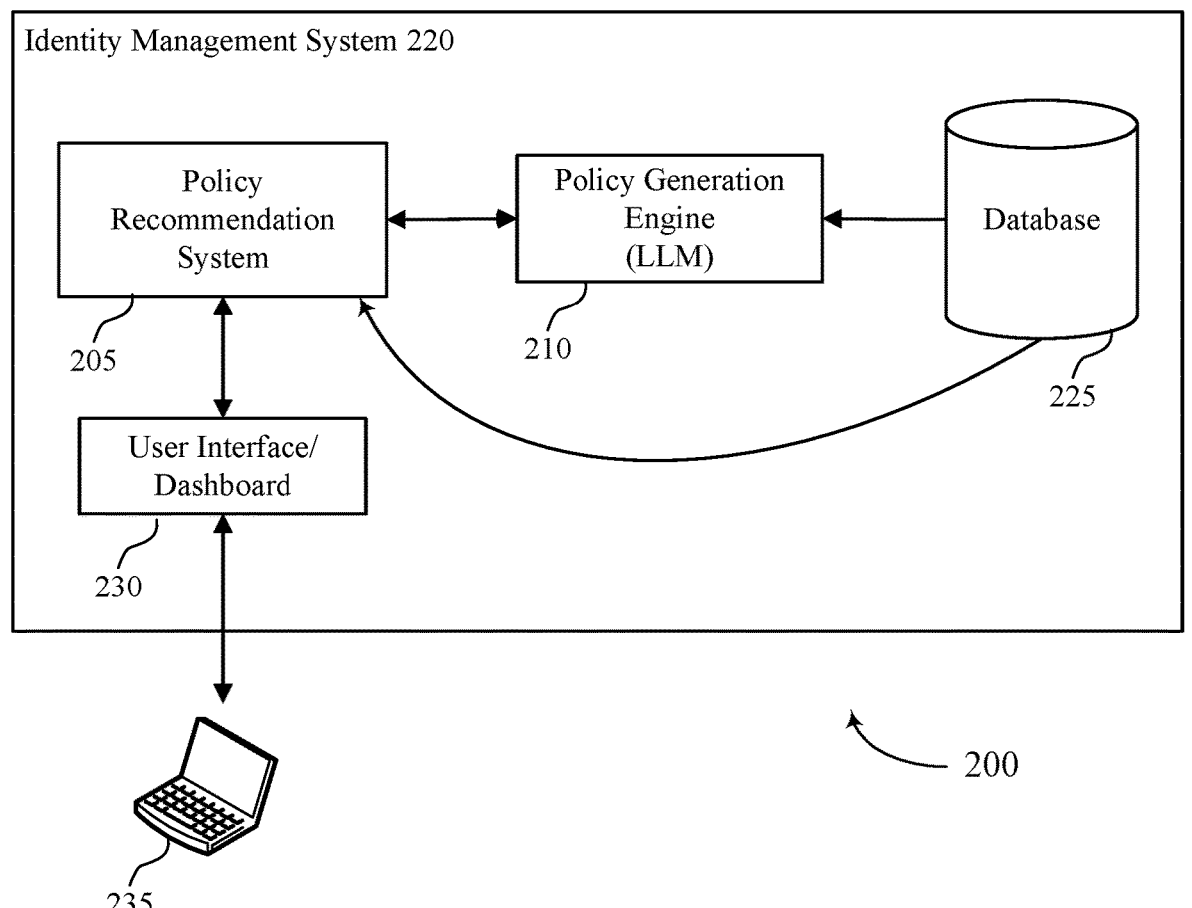
FIG. 2 shows an example of a system architecture that supports generating policy recommendations and insights using generative AI in accordance with aspects of the present disclosure.

FIG. 2 shows an example of a system architecture 200 that supports generating policy recommendations and insights using generative AI in an identity management system 220 in accordance with aspects of the present disclosure. The system architecture 200 may include an identity management system 220 and a client device 235. The identity management system 220 may be an example of identity management system 120 of FIG. 1. The identity management system 220 may comprise a policy recommendation system 205, a policy generation engine 210, at least one database 225, and a user interface and/or dashboard 230. The client device 235 may be a device associated with a client organization and used, for example, by an administrator of the client organization to access the identity management system 220.

The policy recommendation system 205 may be used to generate authentication policy recommendations and insights into how applying a recommended authentication policy may impact a client organization and its users. The policy recommendation system 205 may employ generative AI to generate the recommendations and/or the insights. For example, the policy recommendation system 205 may leverage authentication policy data associated with the various client organizations, and maintained by the identity management system 220, such as in the database 225, to train a machine learning model, such as a large language model, to predict authentication policies that meet best practices and security assurance standards defined by the identity management system 220. The policy recommended system 205 may recommend one or more of the predicted authentication policies to client organizations.

The policy recommendation system 205 may be an example of a subsystem of the identity management system 220 that may be used to support the policy configuration service 180 of FIG. 1. For instance, the client organizations associated with the identity management system 220 may use a service provided by the identity management system 220 to configure authentication policies for the client organization's applications. The authentication policies may be used to enforce particular methods of authentication or particular authentication requirements based on certain conditions that users who attempt to sign in meet. For instance, if a first user attempts to sign in from a particular network or a particular computing platform, the first user may be required to sign in using one authentication method, such as a password. While if a second user attempts to sign in from a different network or a different computing platform, the second user may be required to sign in using a different authentication method, such as a password plus an additional authentication factor. The conditions may not be limited to a type of network or computing platform and may, instead, cover a range of conditions that may be met during the authentication process. The authentication policies for a given client organization may also vary by application, such that a first application associated with the client organization may be associated with an authentication policy that is different from an authentication policy associated with a second application associated with the organization. Further, the authentication policies for different client organizations using the same applications or for the same conditions may vary from one client organization to another.

When the client organizations generate and apply authentication policies to their various application, authentication policy data may be generated and stored in one or more databases associated with the identity management system. The authentication policy data may consist of a set of authentication policy rules comprising conditions and an authentication requirement. As an example, a first authentication policy may have three authentication policy rules, where each of the authentication policy rules are associated with different conditions. For instance, the first rule may be associated with a condition such as "Risk Level=HIGH," and when this condition is met by a user attempting to access an associated application, a first authentication requirement may be enforced, such as the user must authenticate using two-factor authentication. The second rule in this example may be associated with a condition such as "Risk Level=MEDIUM," and when this condition is met by a user attempting to access an associated application, a second authentication requirement may be enforced, such as the user may authenticate with only a password. The third rule in this example may be associated with a condition such as "Risk Level-LOW," and when this condition is met by a user attempting to access an associated application, a third authentication requirement may be enforced, such as the user may authenticate using single sign-on.

Data Preparation

The policy recommendation system 205 may access or collect the authentication policy data associated with multiple client organizations of the identity management system 220 to use the data for training the policy generation engine 210. The policy recommendation system 205 may collect authentication policy data associated with all or a subset of the client organizations. In some cases, the policy recommendation system 205 may collect the authentication policy data by streaming certain application events associated with the client organizations to monitor a given service for new or updated authentication policy data. In some cases, the identity management system 220 may poll certain database tables, such as maintained in the database 225, to identity new or updated authentication policy data. Such streaming or polling may occur on a continuous, periodic, aperiodic, or other basis.

Once collected, the authentication policy data may be preprocessed. For instance, initially the policy recommendation system 205 may cleanse the collected authentication policy data to remove any client organization-specific information, such as personally-identifiable information, customer-specific data, or other sensitive information. During preprocessing, the cleansed data may be aggregated and formatted in manner that may be suitable for input into the policy generation engine 210. The preprocessed data may be used to generate a training dataset for the policy generation engine 210. The training dataset may consist of a corpus of application/condition to authentication policy data records. As an example, the training dataset may include a first record for application "App 1" and condition "Risk Score=HIGH" mapped to authentication policy "Policy 1" that requires two-factor authentication and allows for re-authentication at a frequency of every sign-in attempt. The training dataset may include a second record for application "App 2" and "Computing Platform=DESKTOP" mapped to authentication policy "Policy 2" that requires password authentication only and allows for re-authentication at a frequency of never during an active session. The training dataset may be stored in the database 225 for use in training the policy generation engine 210. In some cases the database 225 may be an example of a data warehouse or a data lake.

Training the Machine Learning Model

The policy generation engine 210 may be an example of a generative AI system or one or more other types of systems that support foundational models (e.g., pre-trained machine learning models), such as large language models (LLMs). For example, the policy generation engine 210 may be an example of, or may employ, a machine learning model (e.g., any machine learning model or any system that may be supported by machine learning models) trained on authentication policy data maintained by the identity management system 220. Although the policy generation engine 210 is illustrated in the example of FIG. 2 as being external to the policy recommendation system 205, the policy generation engine 210 may, in some implementations, be internal to the policy recommendation system 205.

The machine learning model (e.g., a pre-trained machine learning model) associated with the policy generation engine 210 may be refined to support the task of generating authentication policy configurations. In some cases, refinement of the machine learning model may include fine tuning, by training the model with the authentication policy data training dataset, which may cause one or more weights of the machine learning model to be updated or adjusted to improve the model's performance and accuracy with regard to predictions of authentication policy rules for given applications, conditions, or organizations. In some cases, refinement of the machine learning model may include prompt tuning, by training the model using the authentication policy data training dataset without updating weights of the model. The prompt tuning may involve feeding the model front-end prompts or task-specific context that may be iteratively refined based on predictions by the model, thus resulting in more accurate authentication policy predictions from the model.

Accordingly, refining the machine learning model of the policy generation engine 210 may allow the policy generation engine 210 to accurate predict an authentication policy configuration for a given application or for given conditions or both. For instance, the policy generation engine 210 may receive, as input, information identifying an application (e.g., as an application name) and may output an authentication policy configuration predicted as being suitable for the application. In some cases, the policy generation engine 210 may additionally or alternatively receive, as input, one or more conditions, and the policy generation engine 210 may output an authentication policy configuration predicted as being suitable for when the given one or more conditions are satisfied (e.g., independent of any particular application). In some cases, the policy generation engine 210 may receive, as input, a combination of information identifying an application and one or more conditions, and the policy generation engine 210 may output an authentication policy configuration predicted as being suitable for the application when the given one or more conditions are satisfied. In some cases, the prediction may also be based on the particular client organization for whom the authentication policy configuration data is being predicted. For instance, the prediction may be based on the type of client organization, the number of users associated with the client organization, the type of users associated with the client organization, the particular authenticators used by the client organization, or any other characteristic of the client organization that may be maintained by the identity management system 220.

The predicted authentication policy configuration may consist of one or more authentication policy rules that are predicted, to a degree of confidence, as being suitable for the given application, given conditions, given client organization, or a combination thereof. The machine learning model of the policy generation engine 210 may be trained to generate the one or more authentication policy rules in a machine-readable format. The machine-readable format may be a format that is associated with and understandable by the identity management system 220. The machine-readable format may be a programming language format or a language independent data format, such as JavaScript Object Notation (JSON). The one or more authentication policy rules generated in the machine-readable format by the policy generation engine 210 may be in a configuration-ready format, such that the model generated authentication policy rules may be applied by the identity management system 220 as-is to configure an authentication policy for an application.

For instance, the policy generation engine 210 may receive, as input, an application name, such as "APP1," and may output the following authentication policy rule in a JSON format:

```
{
    "verificationMethod": {
        "factorMode": "1FA",
        "type": "ASSURANCE",
        "reauthenticateIn": "PT12H",
        "constraints": [
            {
                "possession": {
                    "deviceBound": "REQUIRED"
                }
            }
        ]
    }
}
```

As another example, the policy generation engine 210 may receive, as input, an application name, such as "APP1," and a condition, such as "RISK SCORE=HIGH," and may output the following authentication policy rule in a JSON format:

```
{
    "verificationMethod": {
        "factorMode": "2FA",
        "type": "ASSURANCE",
        "reauthenticateIn": "PT0S",
        "constraints": [
            {
                "knowledge": {
                    "types": [
                        "password"
                    ],
                    "reauthenticateIn": "PT0S"
                },
                "possession": {
                    "deviceBound": "REQUIRED"
                }
            }
        ]
    }
}
```

The model generated authentication policy rule may be in a format that is suitable to be applied by the identity management system to configure the application (e.g., APP1) with an application policy having the model generated authentication policy rules.

Generate Authentication Policy Recommendations

The identity management system 220 may provide a tool or a user interface/dashboard 230 that interfaces with the policy recommendation system 205. The user interface/dashboard 230 may be an interface or dashboard that allows an administrator of a client organization to configure an authentication policy for an application. The user interface/dashboard 230 may include an option or a control for the administrator to request a recommendation for configuration of an authentication policy configuration for a particular application, for one or more conditions, or for both.

The policy recommendation system 205 may receive the request from the client device 235 associated with the client organization, such as via the user interface/dashboard 230. The policy recommendation system 205 may provide as input to the policy generation engine 210, information identifying the application (e.g., the application name) and/or the one or more conditions. The policy generation engine 210, using the machine learning model, may predict one or more authentication policy rules that may be suitable for the given application, the given one or more conditions, the client organization, or a combination thereof.

The model generated authentication policy rule may indicate one or more policy rule conditions and an authentication requirement that applies when the one or more policy rule conditions are satisfied.

The one or more policy rule conditions may indicate one or more conditions, respectively, that satisfy one or more respective policy rules. For instance, example policy rules maybe be rules associated with: a group of a client organization (such as rules specifying that if a user attempting to sign in to an application is included (or is not included) in a particular group the condition may be satisfied); a user of the client organization (such as rules specifying that if a particular user attempts to sign in to an application the condition may be satisfied, such as based on a user identifier, a user IP address, a domain associated with a user, etc.); a user type; a network zone; a computing platform type (such as desktop, mobile device, a particular operating system type, etc.); a device state (such as registered, enrolled, unregistered, unenrolled); a device management state (such as managed or unmanaged); a risk level; an application instance; an authentication provider; an authentication type; and the like.

The authentication requirement may indicate a type of authentication required (such as an authentication factor type) when the one or more policy rule conditions are satisfied. For instance, examples of types of authentication may include password, possession, biometric, knowledge, multi-factor authentication (which may include a combination of two or more of the aforementioned types of authentication). In some cases, the authentication requirement may additionally indicate one or more authentication constraints to apply when the one or more policy rule conditions are satisfied. Examples of the one or more authentication constraints may include phishing resistant, hardware protected, user presence, user verifying, device bound, exclusion of phone/email authenticators, or the like.

In some cases, the model generated authentication policy rule may further indicate a particular access result that should occur when the one or more policy rule conditions are satisfied, such as access is denied when the one or more policy rule conditions are satisfied, or access is approved (after successful authentication) when the one or more policy rule conditions are satisfied. In some cases, the model generated authentication policy rule may further indicate a re-authentication frequency that is associated with the authentication policy rule. For example, the authentication policy rule may require the user to re-authenticate at every sign-in attempt; each time the session expires; if the user returns to the application's authentication page; never during an active session; or at some defined timed frequency, or the like.

The policy generation engine 210 may output the predicted one or more authentication policy rules in a machine-readable format and provide the predicted one or more authentication policy rules in the machine-readable format to the policy recommendation system 205. The policy recommendation system 205 may interpret the machine-readable format and output, to the user interface/dashboard 230, the predicted one or more authentication policy rules in a user-readable format, such as shown in user interface 300 of FIG. 3. The policy recommendation system 205 may output the predicted authentication policy rules as recommended policy rules for configuring the client organization's application indicated in the recommended request.

In some cases, the policy recommendation system 205 may output some, but not all, of the authentication policy rules generated by the policy generation engine 210. For instance, in some cases, the policy generation engine 210 may further output a confidence metric together with each of the predicted authentication policy rules. The confidence metric may be an indication of a level of confidence calculated by the policy generation engine 210 as to the suitability of the predicated authentication policy rule given the provided input. The confidence metric may be used by the policy recommendation system 205 to select or filter out one or more of the predicted authentication policy rules to recommend to the client organization. For instance, the policy recommendation system 205 may only recommend those model generated authentication policy rules having a confidence metric that satisfies a threshold, such as where the confidence metric is greater than the threshold. In some cases, the policy recommendation system 205 may filter out model generated authentication policy rules having a confidence metric that satisfies a threshold, such as where the confidence metric is below the threshold. In some cases, the policy recommendation system 205 may recommend a threshold number of model generated authentication policy rules. For example, the policy recommendation system 205 may recommend the three model generated authentication policy rules having the three highest confidence metrics.

In some cases, the policy recommendation system 205 may further perform one or more assurance checks on the model generated authentication policy rules to ensure that the model generated authentication policy rules meet best practices or assurance standards of the identity management system. In some cases, the policy recommendation system 205 may recommend only those model generated authentication policy rules that satisfy an assurance threshold. In some cases, the policy recommendation system 205 may refine the model generated authentication policy rules to meet the best practices or assurance standards of the identity management system 220.

Output Recommended Authentication Policy

The policy recommendation system 205 may output, to the user interface/dashboard 230, one or more of the model generated authentication policy rules in a user-readable format. For instance, policy recommendation system 205 may output the various conditions, the authentication requirements (e.g., the type of authentication, and the authentication constraints), the re-authentication frequency, the access results, and the like.

The user interface/dashboard 230 may include one or more options to allow an administrator of the client organization to provide one or more organization-specific conditions to be applied to the model generated authentication policy rules to generate a context-specific recommended policy. For instance, in addition to the one or more policy rule conditions associated with the model generated authentication policy rules, the policy recommendation system 205 may identify one or more additional policy rules that the client organization may use to provide additional context to how the model generated authentication policy rule should be applied for the particular client organization. The additional policy rule conditions may be determined based on the application, the conditions currently associated with the model generated authentication policy rule, information about the client organization, or the like.

The administrator may select one or more of the options output at the user interface/dashboard 230 and provide input, via the client device 235, for a policy rule condition corresponding to a policy rule associated with the selected option. As an example, a first model generated authentication policy rule may indicate a particular authentication requirement that applies when the conditions "Risk Level=HIGH," "Device State=REGISTERED," and "Computing Platform=MOBILE" are satisfied. The policy recommendation system 205 may provide one or more options at the user interface/dashboard 230 for the user to provide information for an additional policy rule condition to apply to the model generated authentication policy rule, such as, for example, a condition for a policy rule associated with a user group that is particular to the client organization. Accordingly, the user interface/dashboard 230 may display an option for the administrator to input the name of the user group (e.g., associated with the client organization) for whom the first model generated authentication policy rule should apply. For example, the administrator may input a user group associated with the client organization's mobile users.

The model generated authentication policy rules may be updated to include the additional policy rule conditions. For instance, the model generated authentication policy rules may be updated to include a new rule, such as "User Group=MOBILE USERS" and the policy recommendation system 205 may generate, using the model generated authentication policy rule, a new context-specific authentication policy rule including the additional policy rule conditions. The context-specific authentication policy rules may be displayed in the user interface/dashboard 230.

In some cases, in addition to outputting the model generated authentication policy rules or the context-specific authentication policy rules, the policy recommendation system 205 may determine, based on the authentication requirements associated with the model generated authentication policy rules or the context-specific authentication policy rules, authenticators that are associated with the client organization and that satisfy the authentication requirement associated with the model generated recommended authentication policy rule or the context-specific recommended authentication policy rule. The policy recommendation system 205 may retrieve the information identifying the authenticators from the database 225. The authenticators may be things such as passwords, answers to security questions, phones (SMS or voice call), authentication applications, or the like that support the authentication requirements indicated by the authentication policy rules.

Impact Analysis

The policy recommendation system 205 may generate insights into an impact that application of the context-specification recommended authentication policy rule may have on the client organization or its users. For example, the policy recommendation system 205 may analyze data associated with the client organization, such as data maintained in database 225, and its users to determine an impact that implementation of one or more of the context-specific recommended policy rules may have on the client organization and its users. The impact analysis may be performed in advance of the client organization actually implementing or configuring an application to use one or more of the context-specific recommended policy rules.

In some cases, the user interface/dashboard 235 may provide an option or control for the administrator to request that the policy recommendation system 205 perform the impact analysis for a particular one of the context-specific recommended authentication policy rules. In other cases, the policy recommendation system 205 may automatically perform the impact analysis without a request from the administrator for each of the context-specific recommended authentication policy rules. The policy recommendation system 205 may determine an impact that implementing a context-specific recommended authentication policy rule may have based on analyzing whether the client organization's users are able to satisfy the authentication requirements associated with the context-specific recommended authentication policy rule given the policy rule's conditions. The policy recommendation system 205 may use the determined authenticators associated with the client organization and may additionally retrieve, from the database 225, information associated with the client organization's users to determine whether such users have access (or a number who have access) to the authenticators necessary to satisfy the authentication requirements and additionally whether the users meet the other associated conditions of the context-specific recommended authentication policy rule (or a number of users who meet the policy rule conditions).

The policy recommendation system 205 may output, to the user interface/dashboard 230, information indicating the impact of implementation of a context-specific recommendation authentication policy rule by the client organization, such as shown in user interface 300 of FIG. 3. For instance, the information may include a quantity or percentage of users who will be impacted by the implementation, a quantity or percentage of impacted users who will be able to satisfy the authentication requirements associated with the context-specific recommended authentication policy rule, or the like.

In some cases, additional information may be output for each of the authenticators associated with the client organization that satisfy the authentication requirements for the context-specific authentication policy rule. For instance, the policy recommendation system 205 may output, for each of the determined authenticators, a quantity or percentage of impacted users who are enrolled with the authenticator, a quantity or percentage of impacted users who are not enrolled with the authenticator but are eligible to enroll with the authenticator, a quantity or percentage or impacted users who are ineligible or are unable to enroll with the authenticator, or the like.

After viewing the impact that implementing a particular context-specific authentication policy rule may have on the client organization, the administrator may decide to edit the context-specific authentication policy rule to adjust one or more of the policy rule conditions, delete the context-specific authentication policy rule, save the context-specific authentication policy rule, or enable the context-specific authentication policy rule. The user interface/dashboard 230 may include options that may allow the administrator to take such actions on each of the context-specific authentication policy rules. Such actions may additionally be performed without viewing an impact that implementing a particular context-specific authentication policy rule may have on the client organization.

Enable Recommended Authentication Policy

The administrator may select, via the user interface/ dashboard 230, one or more of the context-specific recommended authentication policy rules to enable. For instance, based on receiving a selection to enable a first context-specific recommended authentication policy rule, the identity management system 220 cause the application (e.g., the application indicated in the initial request for a recommended authentication policy configuration) to be configured with the selected first context-specific recommended authentication policy rule. In some cases, such as where the administrator did not initially specify an application in the recommendation request, the policy recommendation system 205 may provide, via the interface/dashboard 230, an option for the administrator to input one or more applications to which the selected context-specific recommended authentication policy rule should be applied. In some cases, the policy recommendation system 205 may automatically determine one or more applications associated with the client organization for which the selected policy rule should be applied.

FIG. 3 shows an example of a user interface 300 that supports generating policy recommendations and insights using generative AI in accordance with aspects of the present disclosure. User interface 300 may be an example in which recommended authentication policy rules are output together with a projected impact that applying the recommended authentication policy rules may have on the client organization and its clients.

Figure 4:
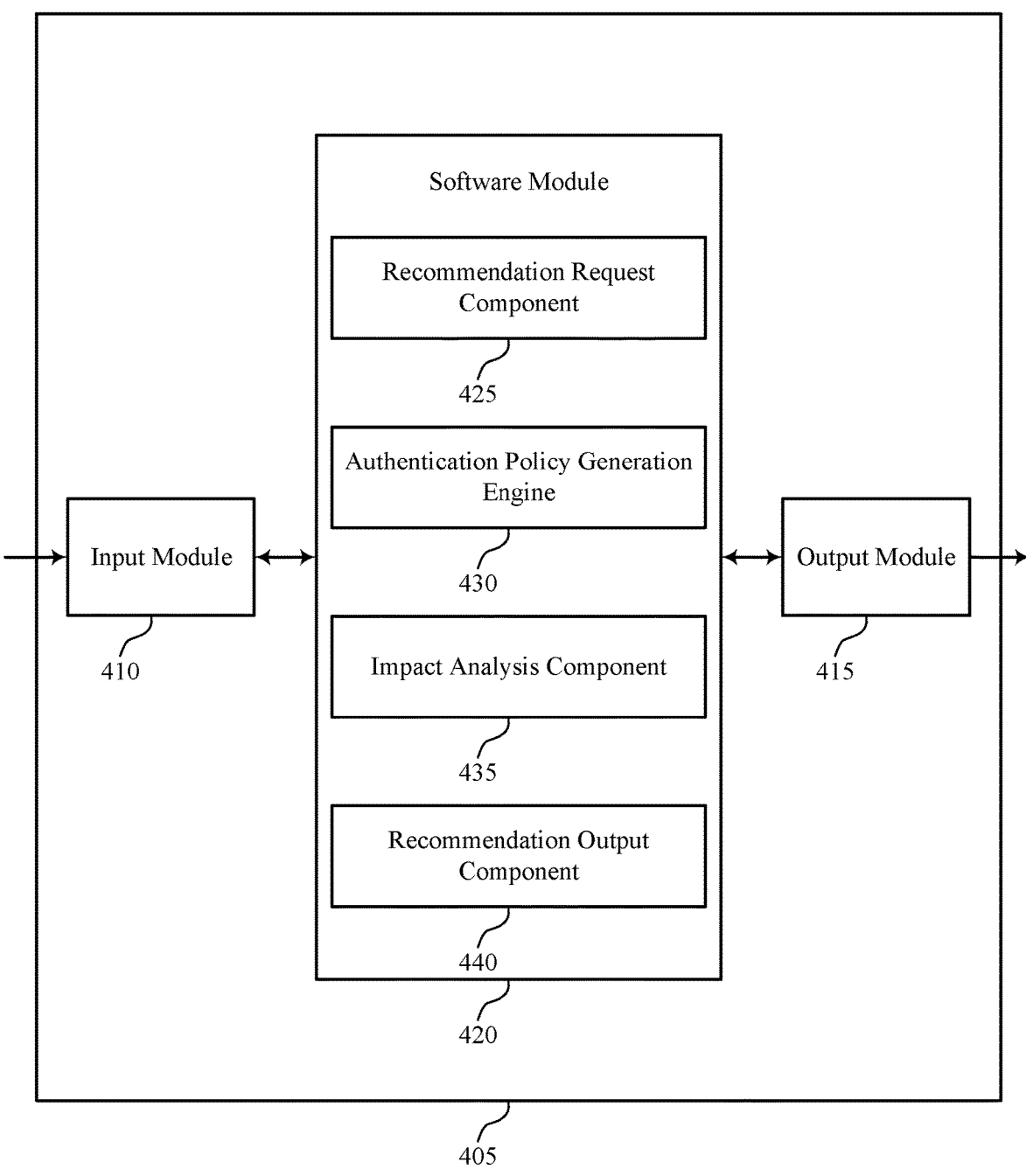
FIG. 4 shows a block diagram of an device that supports generating policy recommendations and insights using generative AI in accordance with aspects of the present disclosure.

FIG. 4 shows a block diagram 400 of a device 405 that supports generating authentication policy recommendations and insights using generative AI in accordance with aspects of the present disclosure. The device 405 may include an input module 410, an output module 415, and a software module 420. The device 405, or one of more components of the device 405 (e.g., the input module 410, the output module 415, and the software module 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the software module 420 to support generating authentication policy recommendations and insights using generative AI. In some cases, the input module 410 may be a component of an input/output (I/O) controller 410 as described with reference to FIG. 6.

The output module 415 may manage output signals for the device 405. For example, the output module 415 may receive signals from other components of the device 405, such as the software module 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 410 as described with reference to FIG. 6.

For example, the software module 420 may include a recommendation request component 425, an authentication policy generation engine 430, an impact analysis component 435, a recommendation output component 440, or any combination thereof. In some examples, the software module 420, or various components thereof, may be configured to perform various operations (e.g., receiving, monitoring, transmitting) using or otherwise in cooperation with the input module 410, the output module 415, or both. For example, the software module 420 may receive information from the input module 410, send information to the output module 415, or be integrated in combination with the input module 410, the output module 415, or both to receive information, transmit information, or perform various other operations as described herein.

The software module 420 may support generating authentication policy recommendations and insights (such as by performing impact analyses) using generative AI The recommendation request component 425 may be configured to support receiving, from a client device associated with a client organization, a request for a recommendation for an authentication policy configuration for an application associated with the client organization, where the request includes information identifying the application. The authentication policy generation engine 430 may be configured to support generating, using a machine learning model and based on the information identifying the application, a model recommended authentication policy rule. The recommendation request component 425 may be further configured to support receiving, from the client device, information associated with the client organization. The impact analysis component 435 may be configured to support generating, based on an analysis of applying the information to the model recommended authentication policy rule to generate a context-specific recommended authentication policy rule, information indicating an impact of implementation of the context-specific recommended authentication policy rule. The recommendation output component 440 may be configured to support outputting the information indicating the impact of implementation of the context-specific recommended authentication policy rule.

Figure 5:
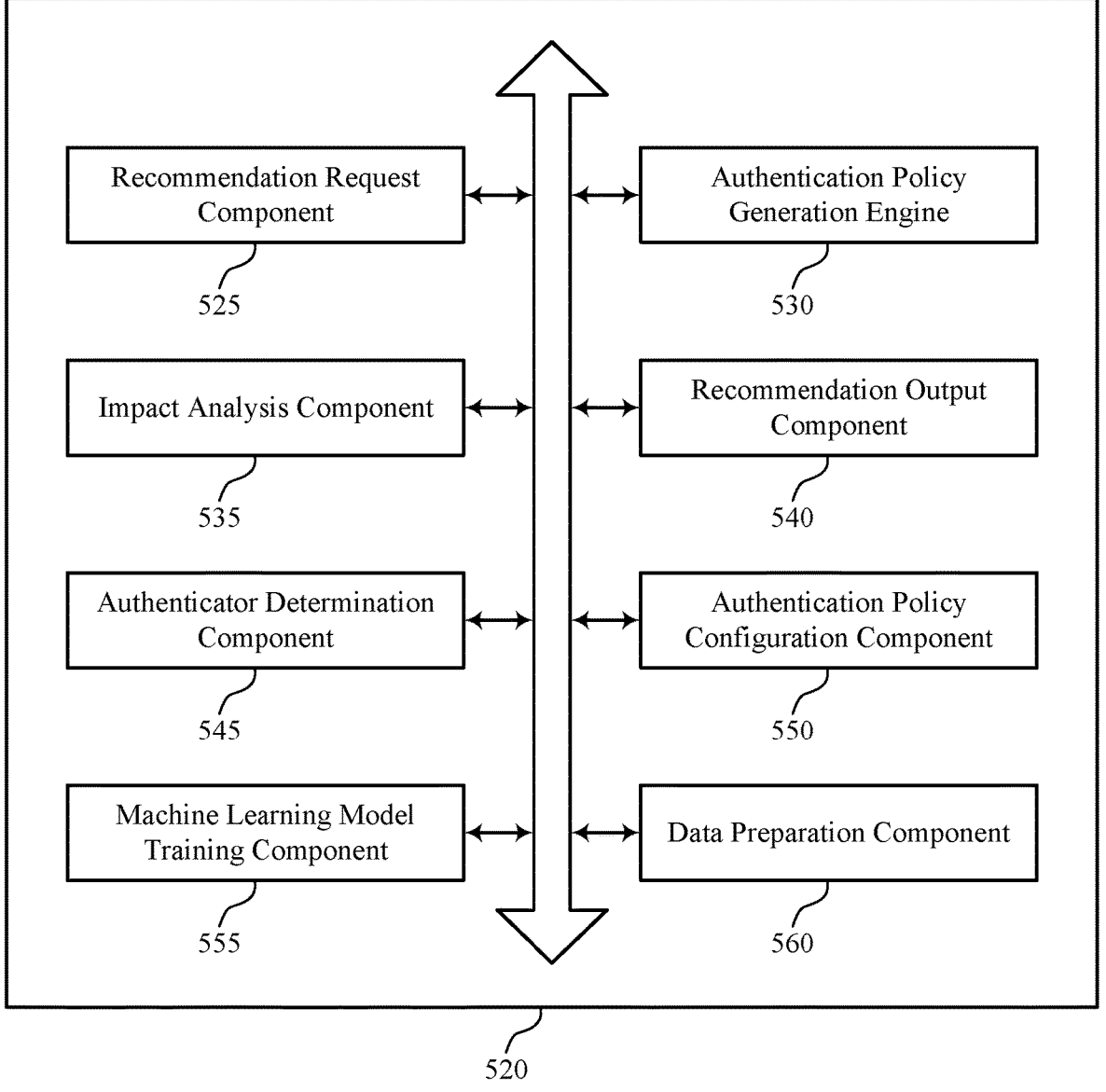
FIG. 5 shows a block diagram of a software module that supports generating policy recommendations and insights using generative AI in accordance with aspects of the present disclosure.

FIG. 5 shows a block diagram 500 of a software module 520 that supports generating policy recommendations and insights using generative AI in accordance with aspects of the present disclosure. The software module 520 may be an example of aspects of a software module or a software module 420, or both, as described herein. The software module 520, or various components thereof, may be an example of means for performing various aspects of generating policy recommendations and insights using generative AI as described herein. For example, the software module 520 may include a recommendation request component 525, an authentication policy generation engine 530, an impact analysis component 535, a recommendation output component 540, an authenticator determination component 545, an authentication policy configuration component 550, a machine learning model training component 555, a data preparation component 560, or any combination thereof. Each of these components, or components of subcomponents thereof (e.g., one or more processors, one or more memories), may communicate, directly or indirectly, with one another (e.g., via one or more buses).

The recommendation request component 525 may be configured to support receiving, from a client device associated with a client organization, a request for a recommendation for an authentication policy configuration for an application associated with the client organization, where the request includes information identifying the application. The authentication policy generation engine 530 may be configured to support generating, using a machine learning model and based on the information identifying the application, a model recommended authentication policy rule. In some examples, the recommendation request component 525 may be further configured to support receiving, from the client organization, information associated with the client organization. The impact analysis component 535 may be configured to support generating, based on an analysis of applying the information to the model recommended authentication policy rule to generate a context-specific recommended authentication policy rule, information indicating an impact of implementation of the context-specific recommended authentication policy rule. The recommendation output component 540 may be configured to support outputting the information indicating the impact of implementation of the context-specific recommended authentication policy rule.

In some examples, to support generating the model recommended authentication policy rule, the recommendation output component 540 may be configured to support outputting, by the machine learning model and based on the information identifying the application, a machine-readable format of the model recommended authentication policy rule. In some examples, the recommendation output component 540 may be further configured to support outputting, based on interpreting the machine-readable format of the model recommended authentication policy, a user-readable format of the model recommended authentication policy rule.

In some examples, the model recommended authentication policy rule may indicate a first set of policy rule conditions, and an authentication requirement that applies when the first set of policy rule conditions are satisfied.

In some examples, the first set of policy rule conditions may indicate one or more conditions that satisfy one or more respective policy rules. In some examples, the one or more policy rules may include rules associated with one or more of: a group, a user, a user type, a network zone, a computing platform type, a device state, a device management state, a risk level, an application instance, an authentication provider, and an authentication type.

In some examples, the recommendation output component 540 may be further configured to support, responsive to generating the model recommended authentication policy rule, outputting the model recommended authentication policy rule and one or more options for inputting a second set of policy rule conditions to be associated with the model recommended authentication policy rule. In some examples, the recommendation request component 525 may be further configured to support receiving an indication of an input of a policy rule condition to at least one of the one or more options.

In some examples, the authenticator determination component 545 may be configured to support determining, based on additional information associated with the client organization, one or more authenticators associated with the client organization that satisfy an authentication requirement associated with the context-specific recommended authentication policy rule.

In some examples, the recommendation output component 540 may be further configured to support, responsive to generating the context-specific recommended authentication policy rule, outputting the context-specific recommended authentication policy rule, and outputting third information indicating the one or more authenticators associated with the client organization that satisfy the authentication requirement associated with the context-specific recommended authentication policy rule.

In some examples, the information indicating the impact of implementation of the context-specific recommended authentication policy rule may include one or more of: a quantity or percentage of users who will be impacted by the implementation, a quantity or percentage of impacted users who will be able to satisfy the authentication requirement associated with the context-specific recommended authentication policy rule, and the one or more authenticators associated with the client organization that satisfy the authentication requirement associated with the context-specific recommended authentication policy rule.

In some examples, the information indicating the impact of implementation of the context-specific recommended authentication policy rule is generated prior to the context-specific recommended authentication policy rule being implemented.

In some examples, the authentication policy configuration component 550 may be configured to support, based on receiving an indication of a selection to enable the context-specific recommended authentication policy rule for the application, causing the context-specific recommended authentication policy rule to be configured for the application for the client organization.

In some examples, the machine learning model training component 555 may be configured to support generating the machine learning model based on refining a pre-trained model using a training dataset including a corpus of authentication policy data.

In some examples, the data preparation component 560 may be configured to support generating the training dataset based on retrieving, from one or more databases, raw authentication policy data associated with a set of multiple client organizations, modifying the raw authentication policy data to mask one or more portions including client organization specific information, and generating, from the modified authentication policy data, the training dataset to include a set of multiple mappings of application and policy rule condition data to authentication policy rule data.

In some examples, the machine learning model includes a large language model.

Figure 6:
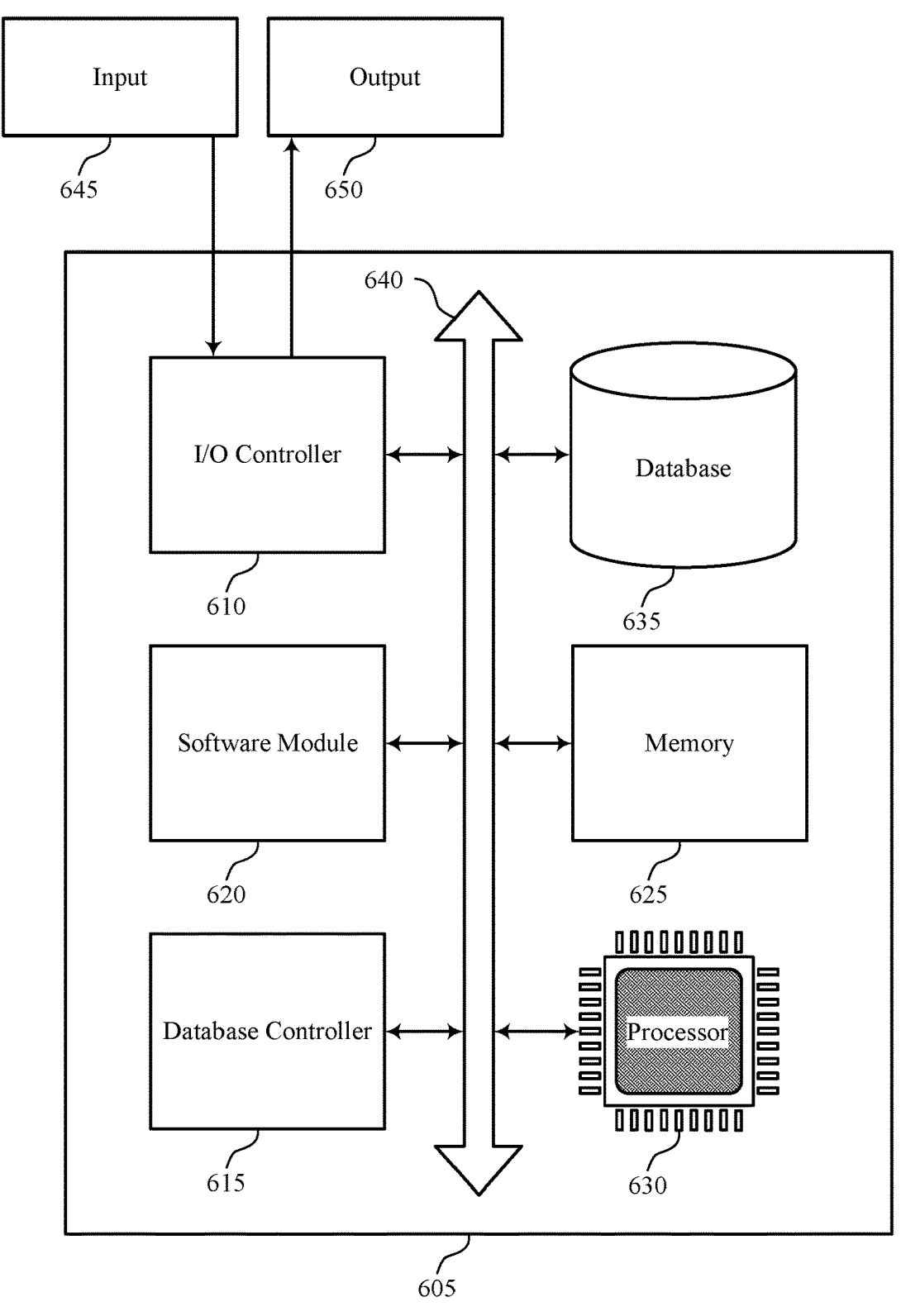
FIG. 6 shows a diagram of a system including a device that supports generating policy recommendations and insights using generative AI in accordance with aspects of the present disclosure.

FIG. 6 shows a diagram of a system 600 including a device 605 that supports generating policy recommendations and insights using generative AI in accordance with aspects of the present disclosure. The device 605 may be an example of or include the components of a device 405 as described herein. The device 605 may include components for bi-directional voice and data communications including components for transmitting and receiving communications, such as a software module 620, an I/O controller 610, a database controller 615, at least one memory 625, at least one processor 630, and at least one database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor #30. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause at least one processor 630 to perform various functions described herein. In some cases, the memory 625 may contain, among other things, a basic I/O system (BIOS) which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting generating policy recommendations and insights using generative AI). The processor 630 may be an example of a single processor or multiple processors. For example, the device 605 may include one or more processors 630.

The software module 620 may be configured to support receiving, from a client device associated with a client organization, a request for a recommendation for an authentication policy configuration for an application associated with the client organization, where the request includes information identifying the application. The software module 620 may be configured to support generating, using a machine learning model and based on the information identifying the application, a model recommended authentication policy rule. The software module 620 may be configured to support receiving, from the client device, information associated with the client organization. The software module 620 may be configured to support generating, based on an analysis of applying the information to the model recommended authentication policy rule to generate a context-specific recommended authentication policy rule, information indicating an impact of implementation of the context-specific recommended authentication policy rule. The software module 620 may be configured to support outputting the information indicating the impact of implementation of the context-specific recommended authentication policy rule.

By including or configuring the software module 620 in accordance with examples as described herein, the device 605 may support techniques for improved communication reliability, improved user experience, and improved security at one or more devices.

FIG. 7 shows a flowchart illustrating a method 700 that supports generating policy recommendations and insights using generative AI in accordance with aspects of the present disclosure. The operations of the method 700 may be implemented by an authentication policy recommendation system or its components as described herein. For example, the operations of the method 700 may be performed by an authentication policy recommendation system as described with reference to FIGS. 1 through 6. In some examples, an authentication policy recommendation system may execute a set of instructions to control the functional elements of the authentication policy recommendation system to perform the described functions. Additionally, or alternatively, the authentication policy recommendation system may perform aspects of the described functions using special-purpose hardware.

At 705, the method may include receiving, from a client device, a request for a recommendation for an authentication policy configuration for an application associated with the client organization, where the request includes information identifying the application. The operations of block 705 may be performed in accordance with examples as disclosed herein. In some examples, aspects of the operations of 705 may be performed by a recommendation request component 525 as described with reference to FIG. 5.

At 710, the method may include generating, using a machine learning model and based on the information identifying the application, a model recommended authentication policy rule. The operations of block 710 may be performed in accordance with examples as disclosed herein. In some examples, aspects of the operations of 710 may be performed by an authentication policy generation engine 530 as described with reference to FIG. 5.

At 715, the method may include receiving, from the client device, information associated with the client organization. The operations of block 715 may be performed in accordance with examples as disclosed herein. In some examples, aspects of the operations of 715 may be performed by a recommendation request component 525 as described with reference to FIG. 5.

At 720, the method may include generating, based on an analysis of applying the information to the model recommended authentication policy rule to generate a context-specific recommended authentication policy rule, information indicating an impact of implementation of the context-specific recommended authentication policy rule. The operations of block 720 may be performed in accordance with examples as disclosed herein. In some examples, aspects of the operations of 720 may be performed by an impact analysis component 535 as described with reference to FIG. 5.

At 725, the method may include outputting the information indicating the impact of implementation of the context-specific recommended authentication policy rule. The operations of block 725 may be performed in accordance with examples as disclosed herein. In some examples, aspects of the operations of 725 may be performed by a recommendation output component 540 as described with reference to FIG. 5.

The following provides an overview of aspects of the present disclosure:

Aspect 1: A method of an authentication policy recommendation system, comprising: receiving, from a client device associated with a client organization, a request for a recommendation for an authentication policy configuration for an application associated with the client organization, wherein the request comprises information identifying the application; generating, using a machine learning model and based at least in part on the information identifying the application, a model recommended authentication policy rule; receiving, from the client device, information associated with the client organization; generating, based at least in part on an analysis of applying the information to the model recommended authentication policy rule to generate a context-specific recommended authentication policy rule, information indicating an impact of implementation of the context-specific recommended authentication policy rule; and outputting the information indicating the impact of implementation of the context-specific recommended authentication policy rule.

Aspect 2: The method of aspect 1, wherein generating the model recommended authentication policy rule comprises: outputting, by the machine learning model and based at least in part on the information identifying the application, a machine-readable format of the model recommended authentication policy rule, and wherein the method further comprises outputting, based on interpreting the machine-readable format of the model recommended authentication policy, a user-readable format of the model recommended authentication policy rule.

Aspect 3: The method of any of aspects 1 through 2, wherein the model recommended authentication policy rule indicates a first set of policy rule conditions, and an authentication requirement that applies when the first set of policy rule conditions are satisfied.

Aspect 4: The method of aspect 3, wherein the first set of policy rule conditions indicate one or more conditions that satisfy one or more respective policy rules, and wherein the one or more respective policy rules comprise rules associated with one or more of a group, a user, a user type, a network zone, a computing platform type, a device state, a device management state, a risk level, an application instance, an authentication provider, and an authentication type.

Aspect 5: The method of any of aspects 1 through 4, further comprising: responsive to generating the model recommended authentication policy rule, outputting the model recommended authentication policy rule and one or more options for inputting a second set of policy rule conditions to be associated with the model recommended authentication policy rule, wherein receiving the information associated with the client organization comprises: receiving an indication of an input of a policy rule condition to at least one of the one or more options.

Aspect 6: The method of any of aspects 1 through 5, further comprising: determining, based on additional information associated with the client organization, one or more authenticators associated with the client organization that satisfy an authentication requirement associated with the context-specific recommended authentication policy rule.

Aspect 7: The method of aspect 6, further comprising: responsive to generating the context-specific recommended authentication policy rule: outputting the context-specific recommended authentication policy rule; and outputting third information indicating the one or more authenticators associated with the client organization that satisfy the authentication requirement associated with the context-specific recommended authentication policy rule.

Aspect 8: The method of any of aspects 1 through 7, wherein the information indicating the impact of implementation of the context-specific recommended authentication policy rule comprises one or more of: a quantity or percentage of users who will be impacted by the implementation, a quantity or percentage of impacted users who will be able to satisfy the authentication requirement associated with the context-specific recommended authentication policy rule, and the one or more authenticators associated with the client organization that satisfy the authentication requirement associated with the context-specific recommended authentication policy rule.

Aspect 9: The method of any of aspects 1 through 8, wherein the information indicating the impact of implementation of the context-specific recommended authentication policy rule is generated prior to the context-specific recommended authentication policy rule being implemented.

Aspect 10: The method of any of aspects 1 through 9, further comprising: based on receiving an indication of a selection to enable the context-specific recommended authentication policy rule for the application, causing the context-specific recommended authentication policy rule to be configured for the application for the client organization.

Aspect 11: The method of any of aspects 1 through 10, further comprising: generating the machine learning model based at least in part on refining a pre-trained model using a training dataset comprising a corpus of authentication policy data.

Aspect 12: The method of aspect 11, further comprising: generating the training dataset based at least in part on: retrieving, from one or more databases, raw authentication policy data associated with a plurality of client organizations; modifying the raw authentication policy data to mask one or more portions comprising client organization specific information; and generating, from the modified authentication policy data, the training dataset to include a plurality of mappings of application and policy rule condition data to authentication policy rule data.

Aspect 13: The method of any of aspects 1 through 12, wherein the machine learning model comprises a large language model.

Aspect 14: A device comprising one or more memories storing processor-executable code, and one or more processors coupled with the one or more memories and individually or collectively operable to execute the code to cause the device to perform a method of any of aspects 1 through 13.

Aspect 15: A device comprising at least one means for performing a method of any of aspects 1 through 13.

Aspect 16: A non-transitory computer-readable medium storing code, the code comprising instructions executable by one or more processors to perform a method of any of aspects 1 through 13.

It should be noted that the methods described above describe possible implementations, and that the operations and the steps may be rearranged or otherwise modified, and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of an authentication policy recommendation system, comprising:

receiving, from a client device associated with a client organization, a request for a recommendation for an authentication policy configuration for an application associated with the client organization, wherein the request comprises information identifying the application;

receiving, from a database associated with the policy recommendation system, a training dataset comprising a set of authentication policy data associated with a plurality of client organizations of the policy recommendation system;

training a machine learning model using the set of authentication policy data;

generating, using the machine learning model and based at least in part on the information identifying the application and on training the machine learning model, a model recommended authentication policy rule;

receiving, from the client device, information associated with the client organization;

generating, based at least in part on an analysis of applying the information to the model recommended authentication policy rule to generate a context-specific recommended authentication policy rule, information indicating an impact of implementation of the context-specific recommended authentication policy rule; and outputting the information indicating the impact of implementation of the context-specific recommended authentication policy rule.

2. The method of claim 1, wherein generating the model recommended authentication policy rule comprises:

outputting, by the machine learning model and based at least in part on the information identifying the application, a machine-readable format of the model recommended authentication policy rule, wherein the method further comprises outputting, based on interpreting the machine-readable format of the model recommended authentication policy, a user-readable format of the model recommended authentication policy rule.

3. The method of claim 1, wherein the model recommended authentication policy rule indicates:

a first set of policy rule conditions, and an authentication requirement that applies when the first set of policy rule conditions are satisfied.

4. The method of claim 3, wherein the first set of policy rule conditions indicate one or more conditions that satisfy one or more respective policy rules, and wherein the one or more respective policy rules comprise rules associated with one or more of a group, a user, a user type, a network zone, a computing platform type, a device state, a device management state, a risk level, an application instance, an authentication provider, and an authentication type.

5. The method of claim 3, further comprising:

responsive to generating the model recommended authentication policy rule, outputting the model recommended authentication policy rule and one or more options for inputting a second set of policy rule conditions to be associated with the model recommended authentication policy rule, wherein receiving the information associated with the client organization comprises receiving an indication of an input of a policy rule condition to at least one of the one or more options.

6. The method of claim 1, further comprising:

determining, based on additional information associated with the client organization, one or more authenticators associated with the client organization that satisfy an authentication requirement associated with the context-specific recommended authentication policy rule.

7. The method of claim 6, further comprising:

responsive to generating the context-specific recommended authentication policy rule:

outputting the context-specific recommended authentication policy rule; and outputting third information indicating the one or more authenticators associated with the client organization that satisfy the authentication requirement associated with the context-specific recommended authentication policy rule.

8. The method of claim 6, wherein the information indicating the impact of implementation of the context-specific recommended authentication policy rule comprises one or more of:

a quantity or percentage of users who will be impacted by the implementation, a quantity or percentage of impacted users who will be able to satisfy the authentication requirement associated with the context-specific recommended authentication policy rule, and the one or more authenticators associated with the client organization that satisfy the authentication requirement associated with the context-specific recommended authentication policy rule.

9. The method of claim 1, wherein the information indicating the impact of implementation of the context-specific recommended authentication policy rule is generated prior to the context-specific recommended authentication policy rule being implemented.

10. The method of claim 1, further comprising:

based on receiving an indication of a selection to enable the context-specific recommended authentication policy rule for the application, causing the context-specific recommended authentication policy rule to be configured for the application for the client organization.

11. The method of claim 1, further comprising:

generating the training dataset based at least in part on:

modifying the authentication policy data to mask one or more portions comprising client organization specific information; and generating, from the modified authentication policy data, the training dataset to include a plurality of mappings of application and policy rule condition data to authentication policy rule data.

12. The method of claim 1, wherein the machine learning model comprises a large language model.

13. An authentication policy recommendation device, comprising:

one or more processors; and one or more memories storing instructions that, when executed by the one or more processors individually or collectively, cause the authentication policy recommendation device to:

receive, from a client device associated with a client organization, a request for a recommendation for an authentication policy configuration for an application associated with the client organization, wherein the request comprises information identifying the application;

receive, from a database associated with the authentication policy recommendation device, a training dataset comprising a set of authentication policy data associated with a plurality of client organizations of the authentication policy recommendation device;

train a machine learning model using the set of authentication policy data;

generate, using the machine learning model and based at least in part on the information identifying the application and on training the machine learning model, a model recommended authentication policy rule;

receive, from the client device, information associated with the client organization;

generate, based at least in part on an analysis of applying the information to the model recommended authentication policy rule to generate a context-specific recommended authentication policy rule, information indicating an impact of implementation of the context-specific recommended authentication policy rule; and output the information indicating the impact of implementation of the context-specific recommended authentication policy rule.

14. The authentication policy recommendation device of claim 13, wherein, to generate the model recommended authentication policy rule, the instructions, when executed by the one or more processors individually or collectively, cause the authentication policy recommendation device to:

output, by the machine learning model and based at least in part on the information identifying the application, a machine-readable format of the model recommended authentication policy rule; and output, based on interpreting the machine-readable format of the model recommended authentication policy, a user-readable format of the model recommended authentication policy rule.

15. The authentication policy recommendation device of claim 13, wherein the model recommended authentication policy rule indicates:

a first set of policy rule conditions, and an authentication requirement that applies when the first set of policy rule conditions are satisfied.

16. The authentication policy recommendation device of claim 15, wherein the instructions, when executed by the one or more processors individually or collectively, further cause the authentication policy recommendation device to:

responsive to generation of the model recommended authentication policy rule, output the model recommended authentication policy rule and one or more options for inputting a second set of policy rule conditions to be associated with the model recommended authentication policy rule, wherein, to receive the information associated with the client organization, the instructions cause the authentication policy recommendation device to receive an indication of an input of a policy rule condition to at least one of the one or more options.

17. The authentication policy recommendation device of claim 13, wherein the instructions, when executed by the one or more processors individually or collectively, further cause the authentication policy recommendation device to:

determine, based on additional information associated with the client organization, one or more authenticators associated with the client organization that satisfy an authentication requirement associated with the context-specific recommended authentication policy rule.

18. The authentication policy recommendation device of claim 13, wherein the instructions, when executed by the one or more processors individually or collectively, further cause the authentication policy recommendation device to:

based on an indication of a selection to enable the context-specific recommended authentication policy rule for the application, cause the context-specific recommended authentication policy rule to be configured for the application for the client organization.

19. A non-transitory, computer-readable medium storing instructions, that when executed by one or more processors individually or collectively, cause an authentication policy recommendation device to:

receive, from a client device associated with a client organization, a request for a recommendation for an authentication policy configuration for an application associated with the client organization, wherein the request comprises information identifying the application;

receive, from a database associated with the authentication policy recommendation device, a training dataset comprising a set of authentication policy data associated with a plurality of client organizations of the authentication policy recommendation device;

train a machine learning model using the set of authentication policy data;

generate, using the machine learning model and based at least in part on the information identifying the application and on training the machine learning model, a model recommended authentication policy rule;

receive, from the client device, information associated with the client organization;

generate, based at least in part on an analysis of applying the information to the model recommended authentication policy rule to generate a context-specific recommended authentication policy rule, information indicating an impact of implementation of the context-specific recommended authentication policy rule; and output the information indicating the impact of implementation of the context-specific recommended authentication policy rule.

* * * * *